United States Patent
Lee et al.

(10) Patent No.: US 12,012,946 B2
(45) Date of Patent: Jun. 18, 2024

(54) THERMOCHROMIC ACTUATORS

(71) Applicant: LINTEC OF AMERICA, INC., Richardson, TX (US)

(72) Inventors: Jaeah Lee, Richardson, TX (US); Marcio Dias Lima, Richardson, TX (US); Sergey Li, Richardson, TX (US); Raquel Ovalle-Robles, Richardson, TX (US)

(73) Assignee: LINTEC OF AMERICA, INC., Plano, TX (US)

( * ) Notice: Subject to any disclaimer, the term of this patent is extended or adjusted under 35 U.S.C. 154(b) by 745 days.

(21) Appl. No.: 17/054,331

(22) PCT Filed: May 10, 2019

(86) PCT No.: PCT/US2019/031793
§ 371 (c)(1),
(2) Date: Nov. 10, 2020

(87) PCT Pub. No.: WO2019/217866
PCT Pub. Date: Nov. 14, 2019

(65) Prior Publication Data
US 2021/0164452 A1 Jun. 3, 2021

Related U.S. Application Data

(60) Provisional application No. 62/670,422, filed on May 11, 2018.

(51) Int. Cl.
*F03G 7/06* (2006.01)
*D01F 8/04* (2006.01)
(Continued)

(52) U.S. Cl.
CPC ............. *F03G 7/0612* (2021.08); *D01F 8/04* (2013.01); *D01F 8/18* (2013.01); *G01K 11/12* (2013.01);
(Continued)

(58) Field of Classification Search
CPC .......... F03G 7/0612; F03G 7/005; D01F 8/04; D01F 8/18; G01K 11/12; D03D 15/275; D10B 2401/04
See application file for complete search history.

(56) References Cited

U.S. PATENT DOCUMENTS

| 4,681,791 A | * | 7/1987 | Shibahashi | ............. D06P 1/004 |
| | | | | 428/196 |
| 2003/0224917 A1 | * | 12/2003 | Lutz | .......................... B30B 3/00 |
| | | | | 492/53 |

(Continued)

FOREIGN PATENT DOCUMENTS

| EP | 0 089 215 A1 | 9/1983 |
| JP | H7-242823 A | 9/1995 |

(Continued)

OTHER PUBLICATIONS

ISR for PCT/US2019/031793, dated Oct. 14, 2019.
(Continued)

*Primary Examiner* — Nathaniel T Woodward
*Assistant Examiner* — Philip L Cotey
(74) *Attorney, Agent, or Firm* — Greenblum & Bernstein, P.L.C.

(57) ABSTRACT

Polymer and nanotube-based actuators that include a thermochromic coating is disclosed. The actuators include a thermochromic material applied to a surface of the core fiber or the conductive element. Upon heating the actuator, the thermochromic coating undergoes a color transition to indicate a pre-determined temperature correlated to a rated (Continued)

critical temperature, important temperature of the actuator components, or a level of actuation.

23 Claims, 7 Drawing Sheets

(51) Int. Cl.
  *D01F 8/18* (2006.01)
  *G01K 11/12* (2021.01)
  *D03D 15/275* (2021.01)
  *F03G 7/00* (2006.01)

(52) U.S. Cl.
  CPC ....... *D03D 15/275* (2021.01); *D10B 2401/04* (2013.01); *F03G 7/016* (2021.08)

(56) References Cited

U.S. PATENT DOCUMENTS

| | | | | |
|---|---|---|---|---|
| 2007/0152199 A1* | 7/2007 | Seeboth | ............... | C09K 9/02 |
| | | | | 374/E11.018 |
| 2007/0243124 A1* | 10/2007 | Baughman | ............. | H01G 11/22 |
| | | | | 423/447.1 |
| 2008/0279253 A1* | 11/2008 | MacDonald | ....... | A41D 13/1281 |
| | | | | 374/E11.018 |
| 2009/0204100 A1* | 8/2009 | Van Pieterson | ......... | A61B 5/01 |
| | | | | 600/549 |
| 2010/0027205 A1* | 2/2010 | Cao | ........................ | G01K 11/12 |
| | | | | 361/679.6 |
| 2012/0137672 A1* | 6/2012 | Pinto, IV | ................ | F03G 7/065 |
| | | | | 60/527 |
| 2013/0177703 A1* | 7/2013 | Clayton | ................ | B41M 5/287 |
| | | | | 427/331 |
| 2014/0366238 A1* | 12/2014 | Owen | ....................... | C09D 7/00 |
| | | | | 2/69 |
| 2017/0325520 A1* | 11/2017 | Chu | ....................... | A61B 5/6805 |
| 2020/0122497 A1* | 4/2020 | Lee | ........................ | B43L 1/002 |
| 2021/0164452 A1* | 6/2021 | Lee | ........................ | F03G 7/005 |
| 2021/0198817 A1* | 7/2021 | Göktepe | ................... | F03G 7/06 |

FOREIGN PATENT DOCUMENTS

| | | |
|---|---|---|
| JP | 2006-522179 A | 9/2006 |
| JP | 2007-49370 A | 2/2007 |
| JP | 2008-523254 A | 7/2008 |
| JP | 2008-543411 A | 12/2008 |
| WO | WO 2006/134437 A1 | 12/2006 |
| WO | WO 2007/015710 A2 | 2/2007 |
| WO | WO 2017/165435 A2 | 9/2017 |

OTHER PUBLICATIONS

IPRP for PCT/US2019/031793, dated Nov. 17, 2020.
Office Action for JP App. No. 2021-513757, dated Jun. 19, 2023 (w/ translation).
Hiraoka et al., "Large Displacement and High Power Fibrous Polymer Actuator", Panasonic Technical Journal, 63(1):95-100 (2017) [English Abstract; JP Office Action].
Office Action for JP App. No. 2021-513757, dated Jan. 23, 2023 (w/ translation).
Office Action for JP App. No. 2021-513757, dated Dec. 25, 2023 (w/ translation).

* cited by examiner

THERMOCHROMIC ACTUATORS

CROSS-REFERENCE TO RELATED APPLICATIONS

This Application claims priority, pursuant to 35 U.S.C. § 119(e) to U.S. Provisional Application 62/670,422 filed on May 11, 2018. The contents of which are hereby incorporated by reference in its entirety.

BACKGROUND OF INVENTION

Artificial actuator devices based on elastic polymeric fibers have a wide range of applications. Devices comprising twisted and/or coiled actuators have the advantage of low cost, high production volume, and design simplicity. Artificial actuator devices may have advantages over small motors because of the greatly simplified engineering and lower product costs. Thermally activated artificial actuators can reach a rated critical temperature at which prolonged use can begin to degrade or damage the actuator. Monitoring the actuator temperature with external equipment, such as a thermocouple, can add undesirable bulk and cost to the device.

SUMMARY

In one aspect, embodiments disclosed herein relate to a polymer actuator that includes a core fiber that has a radial thermal expansion coefficient, a conductive element fixed to the core fiber, and a thermochromic coating comprising a thermochromic material. The thermochromic coating is disposed on a surface of the core fiber or the conductive element.

In another aspect, embodiments disclosed herein relate to a carbon nanotube yarn actuator that includes a carbon nanotube yarn actuator and a thermochromic coating comprising a thermochromic material. The thermochromic coating is disposed on a surface of the carbon nanotube yarn actuator.

In another aspect, embodiments disclosed herein relate to a method of manufacturing a polymer actuator that includes selecting a thermochromic material based upon a group of parameters that includes a transition temperature and a color. The method also includes mixing the thermochromic material into a substantially homogeneous mixture, applying the substantially homogeneous mixture onto a surface of the polymer actuator, and drying the substantially homogeneous mixture to form a thermochromic coating.

In another aspect, embodiments disclosed herein relate to a method of manufacturing a carbon nanotube yarn actuator that includes selecting a thermochromic material based upon a group of parameters that includes a transition temperature and a color. The method includes mixing the thermochromic material and a guest actuation material into a substantially homogeneous mixture and disposing the substantially homogeneous mixture to a carbon nanotube yarn to infiltrate the carbon nanotube yarn before twisting. The substantially homogeneous mixture is dried to form an infiltrated carbon nanotube yarn and twisted into a carbon nanotube yarn actuator. The method also includes applying an additional amount of the substantially homogeneous mixture to a surface of the carbon nanotube yarn actuator; and drying the carbon nanotube yarn actuator with the additional amount of the substantially homogeneous mixture to form a thermochromic coating.

Other aspects and advantages of the claimed subject matter will be apparent from the following description and the appended claims.

BRIEF DESCRIPTION OF DRAWINGS

Certain embodiments of the disclosure will hereafter be described with reference to the accompanying drawings, where like reference numerals denote like elements. It should be understood, however, that the accompanying figures illustrate various implementations described herein and are not meant to limit the scope of various technologies described herein.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the present disclosure will now be described in detail with reference to the accompanying figures. Like elements in the various figures may be denoted by like reference numerals for consistency. Further, it will be apparent to one of ordinary skill in the art that the embodiments disclosed herein may be practiced without the specific details provided to allow a more thorough understanding of the claimed subject matter. Further still, one of ordinary skill in the art will readily recognize that the scale of the elements in the accompanying figures may vary without departing from the scope of the present disclosure.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

One or more embodiments of the present disclosure relate to artificial muscle actuators. One or more embodiments include bundling of artificial muscle fibers to form an artificial muscle actuator. One or more embodiments include creep resistance. One of ordinary skill in the art will appreciate that the embodiments disclosed herein may be used in combination with other embodiments, or incorporated into other existing actuator technologies, such as those incorporated by reference above.

In general, embodiments of the invention relate to a thermochromic actuator and a method of making a thermochromic actuator. More specifically, embodiments herein are directed to a thermochromic actuator that includes at least a thermally activated artificial actuator and a thermochromic coating. The disclosed thermochromic actuator changes color to visibly indicate temperature changes of the artificial muscle actuator.

For example, an actuator with a thermochromic coating with a blue color at room temperature (an ambient 20° C.) may change color according to the actuation. The actuator may be a thermally activated artificial actuator of any type, including but not limited to polymer based artificial actuators or carbon nanotube (CNT) yarn actuators. Thermally activated artificial actuators operate within a temperature range according to the physical properties of the constituent elements of the artificial actuator. A thermally activated artificial actuator typically has a rated failure temperature at which the actuator or the constituent materials begin to degrade or fail, e.g., 180° C. in a polymer based artificial actuator.

In one or more aspects of a polymer based artificial actuator, a bundle of one or more core fibers is connected to a conductive element used to heat the core fiber material. The core fiber of a polymer based artificial actuator has a positive axial coefficient of thermal expansion and a negative linear coefficient of thermal expansion. The core fiber fiber can be made of nylon, polyethylene, polyester, PET, PEN, polypropylene, PVDF, PEEK, LCP polymer, Kevlar®, Vectran®, or CNT yarn, but the core fiber is not particularly limited to these materials. A wide variety of materials can be used as the conducting element such as nylon, tungsten, CNT Yarn, CNT sheet, carbon fibers, Kevlar®, silver-plated nylon, metal sheets or ribbons, Vectran®, Dyneema®, Toyobo ZYLON®, Invar alloy, Fe—Ni alloys, or highly-aligned polymer fibers, but the conducting element is not particularly limited to these materials.

The core fiber and conductive element are connected such that the heat generated by running an electrical current through the conducting element causes the core fiber to expand axially and contract longitudinally. The current may be 5-100 mA driven at 13-32 V, but the current and voltage are not particularly limited to these ranges. The conductive element may be coaxially embedded within the core fiber, helically wound around the core fiber, helically wound and embedded within the surface of the core fiber, or bundled amongst multiple core fibers, but not particularly limited to these arrangements. Depending on the fixation method and orientation of the actuator, the temperature induced change in physical geometry causes the actuator to actuate in a rotational or linear manner.

In one or more aspects of a carbon nanotube yarn actuator, a stack of 1 to 100 carbon nanotube sheets, but not particularly limited to this range of sheets, are lightly twisted together to form a CNT yarn. The CNT yarn is impregnated or infiltrated with a guest actuation material that has a thermal expansion coefficient to complement the high tensile strength of the CNTs. A wide variety of materials can be used as the guest actuation material such as silicone rubber (e.g., SeelGuard 184), a mixture of silicone rubber and thermochromic material, polyurethane, styrene-butadiene copolymer, natural rubber, fluorinated plastics including perfluoroalkoxy alkane (PFA), polytetrafluoroethylene (PTFE), fluorinated ethylene propylene (FEP), aramids including Kevlar® and Nomex®, epoxies, polyimides, and paraffin wax, but the guest actuation material is not particularly limited to these materials. The guest actuation material may be applied by simple coating, brushing, dipping, spraying, or vacuum assisted infiltration, but applying the guest actuation material is not particularly limited to these techniques. Vacuum assisted infiltration is defined as applying a coating in a container under vacuum and then restoring pressure to the container to allow air pressure to force the coating into the fibers and layers of the carbon nanotube yarn.

The infiltrated CNT yarn is then twisted, i.e., twisted additional times, to form a coiled infiltrated CNT yarn that acts as a CNT yarn actuator. A CNT yarn actuator can be heated by running an electrical current through the CNTs, causing the coiled infiltrated CNT yarn to expand axially and contract longitudinally. Depending on the fixation and orientation of the actuator, the temperature induced change in physical geometry causes the actuator to actuate in a rotational or linear manner.

In one or more embodiments of the invention, the thermochromic coating may be a mixture of one or more thermochromic materials coating all or part of the external surface of the actuator. A thermochromic material is defined as a material that changes color when its temperature increases or decreases past a transition temperature. A transition temperature is defined as the temperature at which the thermochromic material transitions from one color to a different color, e.g., from blue to white. For example, a blue color thermochromic coating may transition to a white color when the actuator is heated above the transition temperature of the thermochromic material, 31° C.

In one or more embodiments of the invention, the thermochromic material may be, but are not limited to, a pigment, powder, ink, resin, or paint of Chromadic Creations Inc. (SpectraBurst™ line), the Atlanta Chemical Engineering Company LLC, or Everyglow. Transition temperatures range from −20° C. to +110° C. but the transition temperature is not particularly limited to this range. The rated transition temperature can vary from the actual transition temperature by +/−1° C. but the rated transition temperature is not particularly limited by this range. Examples of the thermochromic material include, but are not limited to, Black CCP001, Sapphire Blue CCP002, Deep Blue CCP003, Grass Green CCP005, Peacock Green CCP006, Red CCP008, Peach CCP009, Yellow CCP011 resins of Chromadic Creations Inc.

Figure 1A:
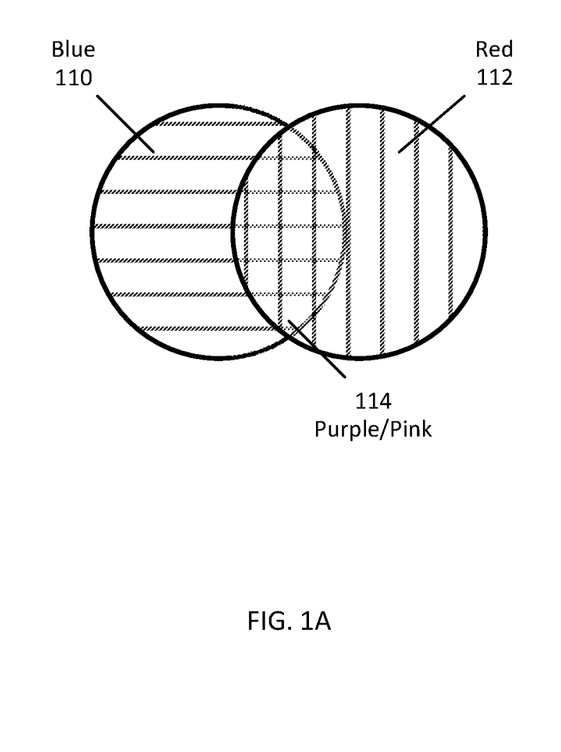
FIG. 1A illustrates a schematic for the blending thermochromic materials in accordance with one or more of the embodiments of the invention.

FIG. 1A illustrates a schematic for the blending of a blue and red thermochromic material to produce two color transitions in a single thermochromic coating according to one or more of the embodiments of the invention. A first thermochromic material 110 has a blue color at room temperature and transitions to a white color above its transition temperature, 31° C. A second thermochromic material 112 has a red color at room temperature and transitions to a white color above the its transition temperature, 45° C. When mixed together into a homogeneous mixture 114, the combined thermochromic materials have a purple color at room temperature.

In one or more embodiments of the invention, the homogeneous mixture has two transition temperatures and visibly changes color two times as the mixture is heated up from room temperature, 20° C., to an elevated temperature of 100° C. At 31° C., the blue thermochromic component of the mixture transitions to white causing the homogeneous mixture to change from purple to pink, i.e., the combination of white and red. Because the transition temperature of the red thermochromic component of the homogenous mixture has not been reached, the red color remains and blends with the new white color to produce an overall pink color for the homogeneous mixture between 31° C. and 45° C. At 45° C., the red thermochromic component of the mixture also transitions to white causing the homogenous mixture to change from pink to white.

Figure 1B:
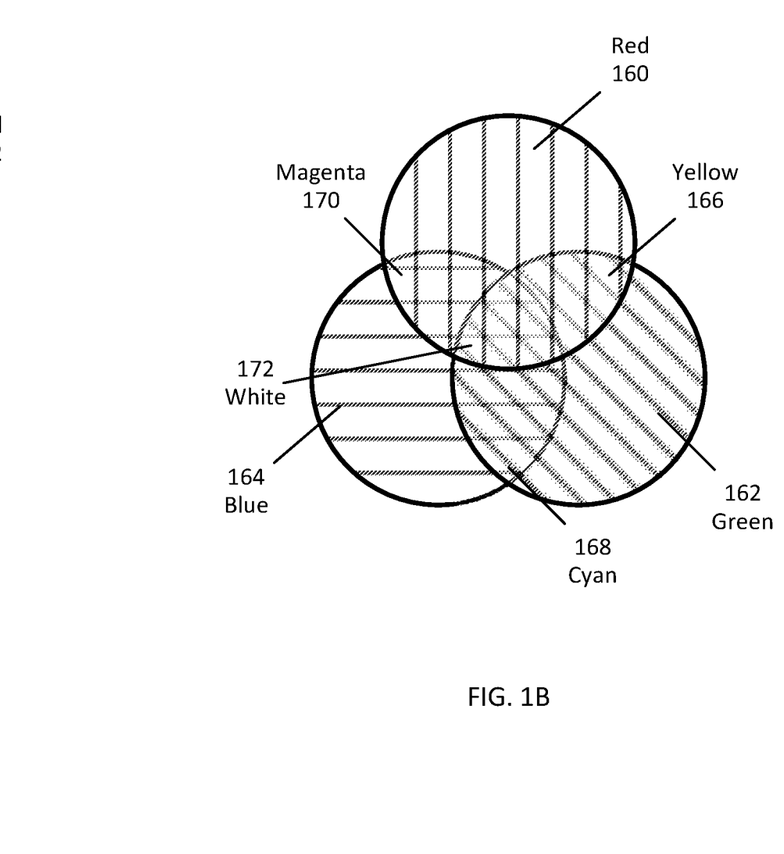
FIG. 1B illustrates a schematic for blending multiple colors to produce multiple color transitions in accordance with one or more of the embodiments of the invention.

FIG. 1B illustrates a schematic for blending multiple colors to produce multiple color transitions in a single thermochromic coating according to one or more of the embodiments of the invention. In a manner like that described above, two or more thermochromic materials can be combined to achieve a higher number of transition temperatures in a single thermochromic coating. Using color theory, not limited to additive or subtractive color methods, any possible color can be created using the mixture of two or more colors. In FIG. 1B, a schematic of additive color combination illustrates red 160, green 162, and blue 164 primary colors combined to create yellow 166, cyan 168, magenta 170, and white 172 colors. The present invention is not limited to these primary colors, combined colors, or method of mixing colors. For example, a green color (not shown) can be obtained by subtraction, i.e., filtering out, of yellow and cyan light from an ambient white light source illuminating the actuator. Those skilled in the art will appreciate that all of the particular colors described in this specification may be substantial approximations of the stated color and variations in the tint, shade, tone, and/or hue of the color may occur without departing from the spirit of the disclosure.

Figure 2:
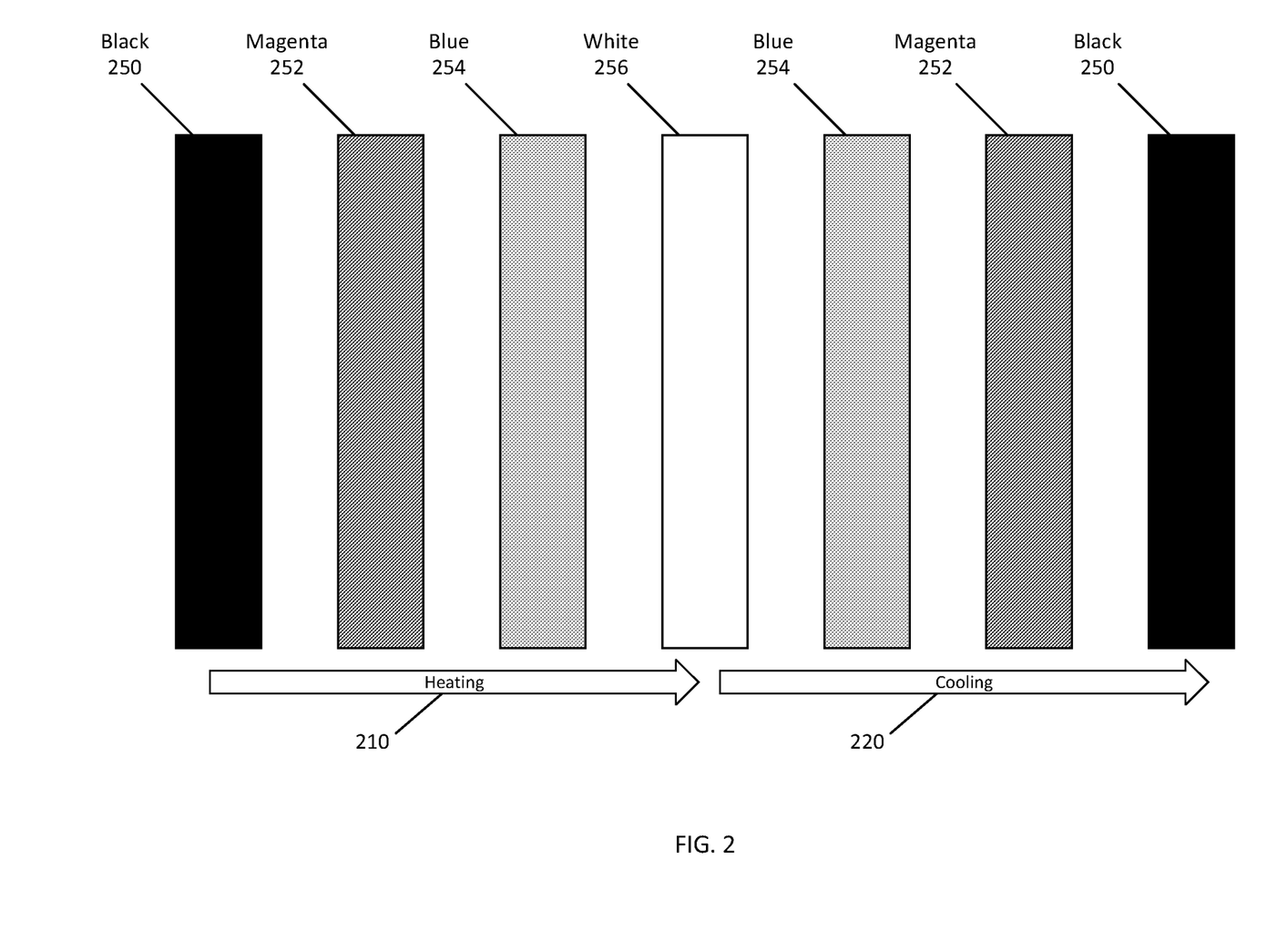
FIG. 2 illustrates a transitioning thermochromic actuator in accordance with one or more of the embodiments of the invention.

FIG. 2 illustrates an exemplary thermochromic actuator transitioning through multiple colors during a heating phase 210 and transitioning through the same colors in the opposite order during a cooling phase 220. In one or more embodiments of the invention, a thermochromic actuator with several thermochromic materials can change color multiple times to indicate a progressive increase or decrease in temperature, visually indicating the status of the actuator to the user or operator. In this non-limiting example, the thermochromic actuator has three thermochromic material components with three transition temperatures: 70° C., 100° C., and 150° C. The thermochromic actuator starts with black color 250 at room temperature. As the device heats up, whether by increased power supplied to the actuator or by ambient heating, the coating transitions to a magenta color 252 at 70° C., then to a blue color 254 at 100° C., and finally to a white color 256 at 150° C. As the thermochromic actuator cools down, whether by active or passive cooling techniques, the coating undergoes the reverse color transitions, transitioning from the white color 256 at 150° C. to the blue color 254 at 100° C., to the magenta color 252 at 70° C., and finally back to the black color 250 at room temperature.

In one or more embodiments of the invention, one or more thermochromic materials of the thermochromic coating are indicators of a rated critical temperature. A rated critical temperature is defined as any temperature relevant to the operation of the actuator, e.g., the temperature at which degradation begins or at which failure occurs. By choosing a thermochromic material with a transition temperature suitably close to a rated critical temperature of the actuator, the corresponding color changes in indicates that appropriate steps should be taken by the user, e.g., disabling the actuator to allow the temperature to decrease. In one non-limiting example, the last color transition 256 at 150° C. shown in of FIG. 2 can indicate a material based artificial actuator is close to the rated failure temperature of 180° C. and the user should understand that the device temperature is within a cautionary temperature range.

Figure 3:
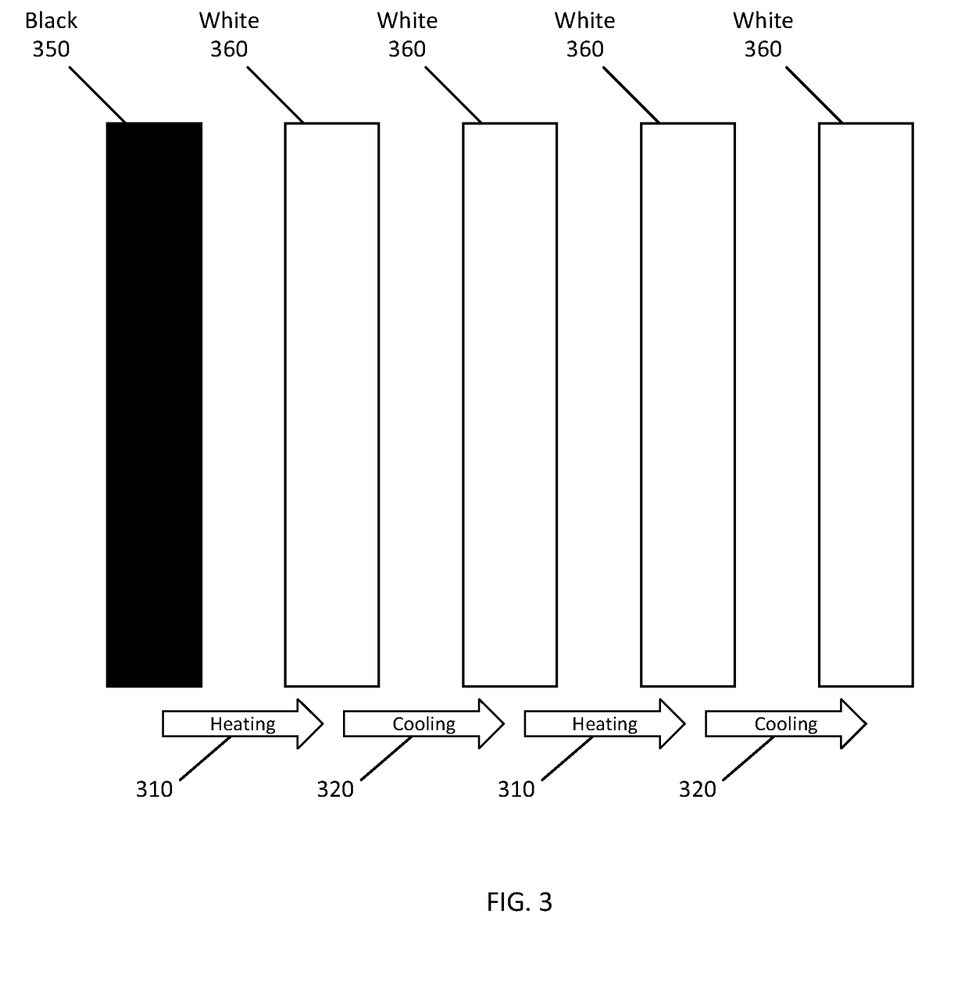
FIG. 3 illustrates a thermochromic actuator in accordance with one or more of the embodiments of the invention.

FIG. 3 illustrates an exemplary thermochromic actuator using an irreversible thermochromic material that does not revert to the original color after passing the transition temperature according to one or more of the embodiments of the invention. An irreversible thermochromic material is a type of thermochromic material that has a permanent color change at a transition temperature. In this non-limiting example, the thermochromic actuator has a single irreversible thermochromic material with a transition temperature of 180° C. As the thermochromic actuator heats up during the heating stage 310, whether by increased power supplied to the actuator or by ambient heating, the thermochromic coating transitions from a black color 350 at room temperature to a white color 360 at 180° C. As the thermochromic actuator cools down from 180° C. to room temperature during cooling phase 320, whether by active or passive cooling techniques, the thermochromic actuator permanently retains the white color 360. The thermochromic actuator retains the white color 360 during any subsequent heating phases 310 or cooling phases 320.

In one or more embodiments of the invention, one or more irreversible thermochromic materials in the thermochromic coating are indicators of a rated critical temperature. By choosing an irreversible thermochromic material with a transition temperature at a rated critical temperature of the actuator, the corresponding color changes indicates that the rated critical temperature has been reached and the appropriate action should be taken by the user, e.g., disabling the actuator to allow the temperature to decrease. In one non-limiting example, the color transition to a white color 360 at 180° C. shown in of FIG. 3 can indicate a polymer based artificial actuator has reached the rated failure temperature of 180° C. and the user should understand that the device may have been compromised by the excess temperature.

In one or more embodiments of the invention, one or more irreversible thermochromic materials in the thermochromic coating may be hot-spot indicators of a rated critical temperature. A hot-spot is defined as a localized region of the thermochromic actuator, ranging from a single point to a substantial portion of the actuator. In other words, a hot spot has a temperature that deviates from that of the rest of the actuator. In one non-limiting example, the transition temperature of the irreversible thermochromic material may be set above the rated failure temperature of a polymer based artificial actuator. After a temperature spike above the transition temperature, the color transition on the thermochromic actuator may be limited to one or more hot-spots on the actuator. These colored hot-spots can be used to identify weak points on the actuator that may have been compromised by the excess temperature.

Examples of the irreversible thermochromic material include, but are not limited to, ITP-BC60 (Blue-Colorless 140F (60 C)) or ITP-CP85 (Colorless-Pink 185 F (85 C)) thermochromic paints of Atlanta Chemical Engineering LLC.

Figure 4:
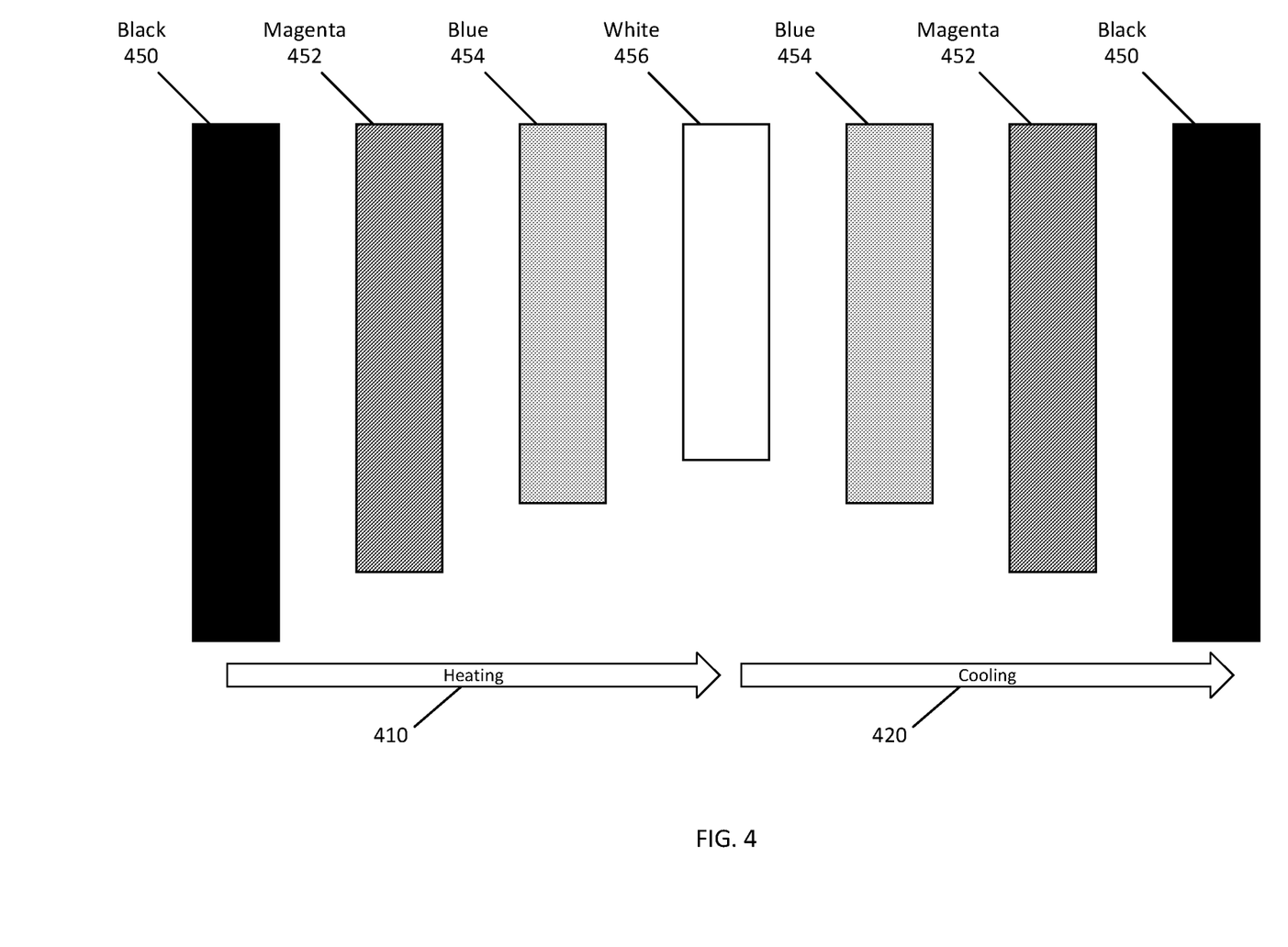
FIG. 4 illustrates a thermochromic actuator in accordance with one or more of the embodiments of the invention.

FIG. 4 illustrates a thermochromic actuator with transition temperatures correlated to specific levels of actuation. In one or more embodiments of the invention, a thermochromic actuator with several thermochromic materials can change color multiple times to indicate a progressive increase or decrease in actuation level, visually indicating the status of the actuator to the user or operator. In this non-limiting example, the thermochromic linear actuator has three thermochromic material components with three transition temperatures: 40° C., 70° C., and 100° C. The thermochromic actuator starts with black color 450 at room temperature. As the device heats up during heating phase 410, whether by increased power supplied to the actuator or by ambient heating, the coating transitions to a magenta color 452 at 40° C. and 10% actuation, then to a blue color 454 at 70° C. and 20% actuation, and finally to a white color 456 at 100° C. at 30% actuation. As the thermochromic actuator cools down during cooling phase 420, whether by active or passive cooling techniques, the coating undergoes the reverse color transitions, transitioning from the white color 456 at 100° C. and 30% actuation to the blue color 454 at 70° C. and 20% actuation, to the magenta 452 color at 40° C. and 10% actuation, and finally back to the black color 450 at room temperature and 0% actuation.

In one or more embodiments of the invention, the color change of the thermochromic coating may be used as an indicator of the level of actuation in the actuator, which may be in a linear or torsional (not shown) mode. The level of actuation is directly correlated to the thermal expansion of the actuator material, e.g., the core fiber of a polymer actuator or the infiltrated carbon nanotube yarn of a carbon nanotube yarn actuator. Therefore, the steady state level of actuation is directly correlated to the temperature of the actuator material. The temperature of the actuator may change faster than the actuator actuates due to the different physical and thermal characteristic of the actuator material. Mapping of the actuator position has been demonstrated with a precision of +/−1° C. The rated transition temperature of a thermochromic material may be precise to +/−1° C. Therefore, the color transitions can be mapped to specific levels of actuation with a precision of +/−2° C.

Figure 5:
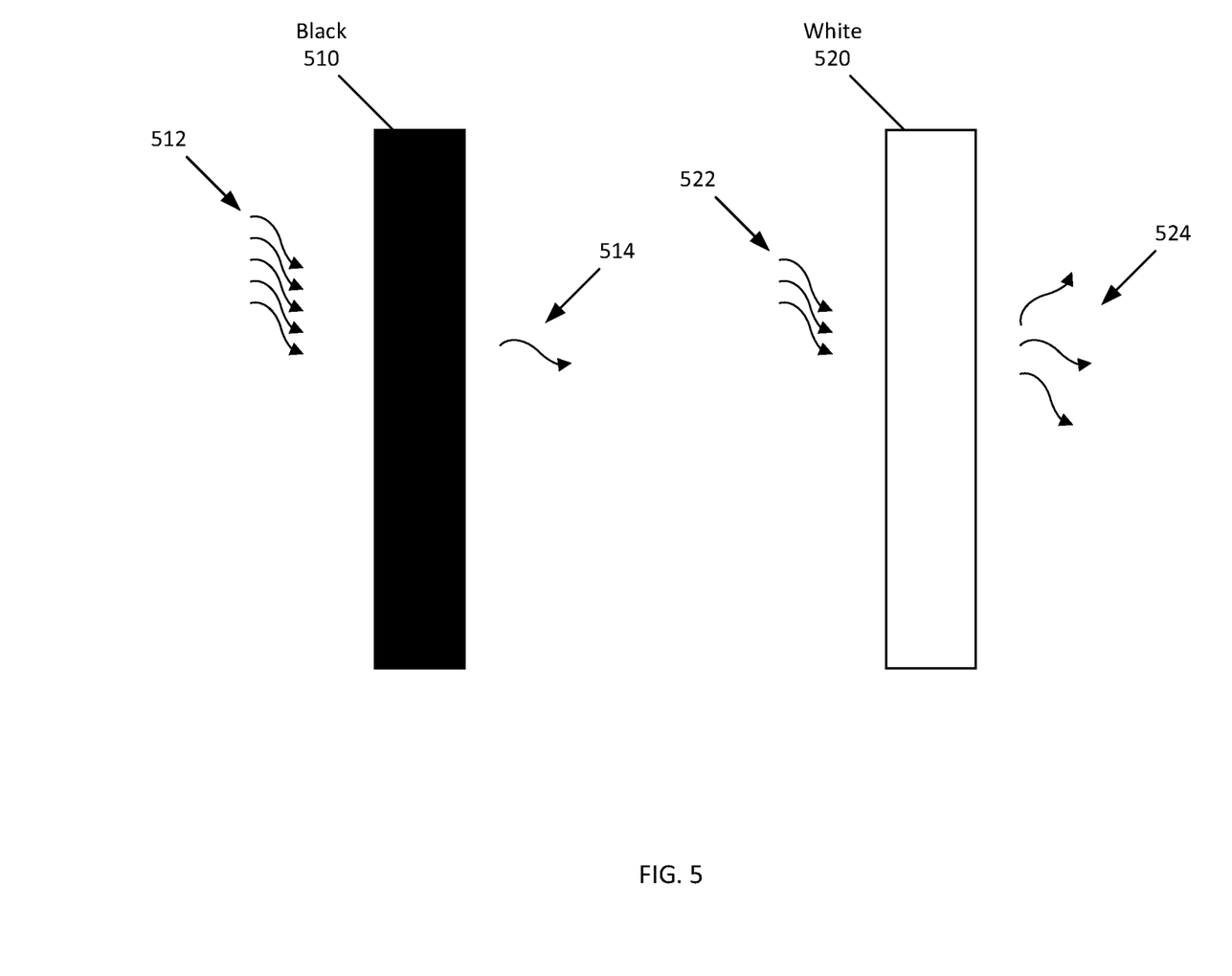
FIG. 5 illustrates a thermochromic actuator with a substantially black thermochromic coating in accordance with one or more of the embodiments of the invention.

FIG. 5 illustrates an exemplary thermochromic actuator with a substantially black color 510 thermochromic coating at room temperature which transitions to a substantially white color 520. The substantially black color 510 absorbs incident thermal radiation 512 to aid in heating the actuator and radiates a relatively lower amount of emitted thermal radiation 514. The substantially white color 520 radiates a larger amount of emitted thermal radiation 524 to aid in cooling the actuator and absorbs a relatively lower amount of incident thermal radiation 522. The thermodynamic properties of the thermochromic coating therefore aid in the operation of the thermally activated actuator.

In one or more embodiments of the invention, one or more thermochromic materials in the thermochromic coating are chosen to have a substantially black color at the lower limit of the operational temperature range of the actuator and a substantially white color at temperature at the upper limit of the operational temperature range of the actuator. Substantially black is defined as an absorbing color having spectral absorption spanning the visible and near infrared regions of the electromagnetic spectrum but the absorption is not particularly limited to these regions. Substantially white is defined as a reflecting color having spectral emissivity or reflectivity spanning the visible and near infrared regions of the electromagnetic spectrum but emissivity or reflectivity are not particularly limited to these regions.

Figure 6:
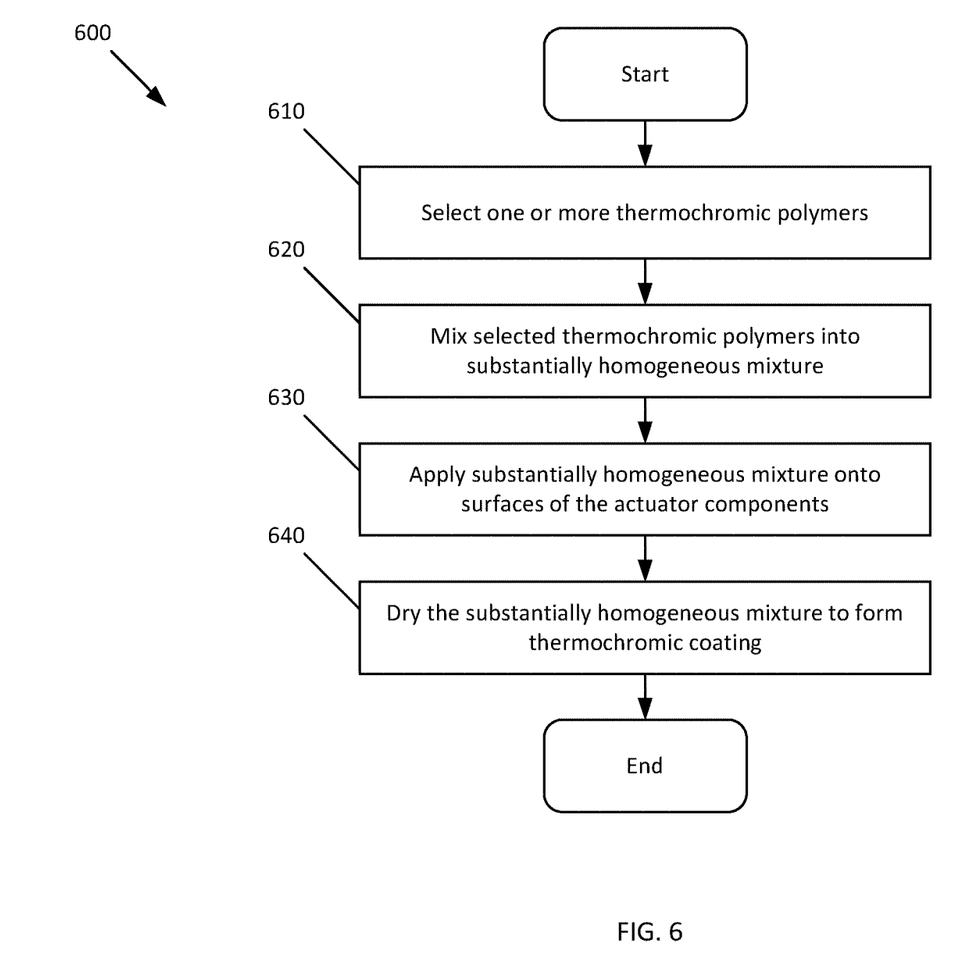
FIG. 6 illustrates a method for manufacturing a polymer actuator according to one or more of the embodiments of the invention.

FIG. 6 illustrates a method 600 for manufacturing a polymer actuator. According to one or more of the embodiments of the invention, one or more thermochromic materials are selected in step 610 based upon the transition temperatures, corresponding colors on both sides of the transition temperatures, the thermodynamic properties, or other parameters suitable for the application of the actuator. In step 620, the selected thermochromic materials are mixed together using any suitable means to achieve a substantially homogeneous mixture. A substantially homogeneous mixture is defined as a mixture with a suitably consistent color for the desired application or the user. In step 630, the substantially homogeneous mixture is disposed onto the surfaces of the actuator by means of painting, dipping, spraying, or brushing, but the deposition is not particularly limited to these methods. The mixture may coat one or more components of the actuator, such as the one or more core fibers, or the one or more the conductive elements, or any other internal or external surface. The mixture may coat one or more portions of the actuator or the entirety of the actuator. In step 640, the homogeneous mixture is dried to form the thermochromic coating by any means suitable to drying or setting the thermochromic material. The method of drying the coating can be drying at room temperature overnight, drying in an oven for a shorter period, drying under flowing gas, or drying by residual heat of operation of the actuator, but the drying is not particularly limited to these methods.

Figure 7:
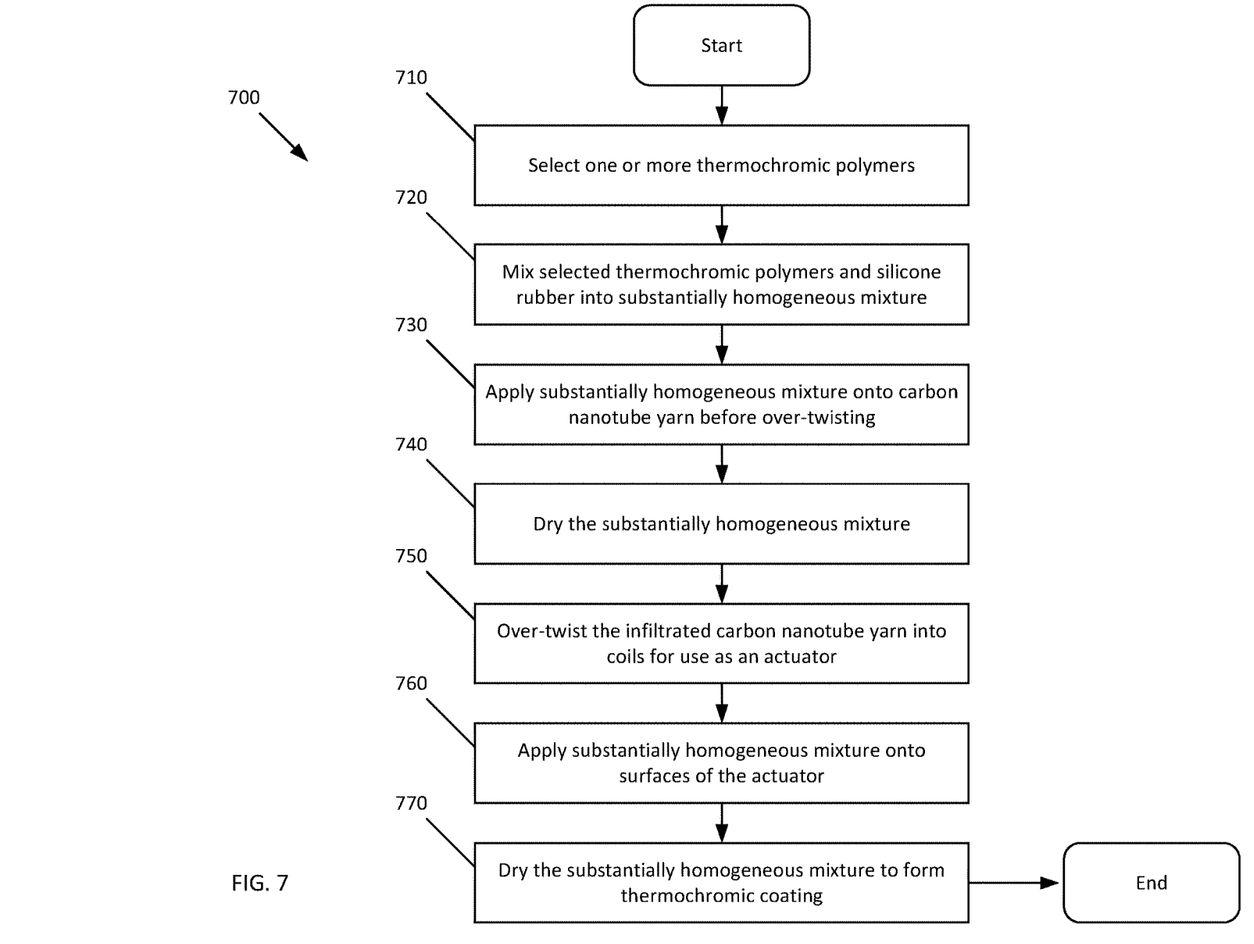
FIG. 7 illustrates a method for manufacturing a carbon nanotube yarn actuator according to one or more of the embodiments of the invention.

FIG. 7 illustrates a method 700 for manufacturing a carbon nanotube yarn actuator. According to one or more of the embodiments of the invention, a thermochromic material is selected in step 710 based upon the transition temperature, corresponding colors on both sides of the transition temperature, the thermodynamic properties, or other parameters suitable for the application of the actuator. In step 720, the selected thermochromic material is mixed together with a guest actuation material, e.g., silicone rubber, using any suitable means to achieve a substantially homogeneous mixture. In step 730, the substantially homogeneous mixture is disposed onto a surface of the carbon nanotube yarn before twisting, i.e., after a stack of carbon nanotube sheets are lightly twisted together to form a carbon nanotube yarn. The substantially homogeneous mixture is disposed onto carbon nanotube yarn by means of simple coating, brushing, dipping, spraying, or vacuum assisted infiltration, but the deposition is not particularly limited to these techniques. The mixture may coat one or more portions of the carbon nanotube yarn or the entirety of the carbon nanotube yarn. In step 740, the homogeneous mixture is dried by any means suitable to drying or setting the mixture while allowing enough time for mixture to infiltrate the layers of the carbon nanotube yarn. The method of drying the coating can be drying at room temperature overnight but the drying is not particularly limited to this method.

In step 750, the infiltrated CNT yarn is then twisted, i.e., twisted additional times, to form a CNT yarn actuator. In one or more embodiments, the CNT yarn actuator may be coiled from the twisting. In step 760, an additional amount of the substantially homogeneous mixture is disposed onto carbon nanotube yarn actuator by means of simple coating, brushing, dipping, spraying, or vacuum assisted infiltration, but the deposition is not particularly limited to these techniques. In step 770, the homogeneous mixture is dried to form the thermochromic coating by any means suitable to drying or setting the mixture. The method of drying the coating can be drying at room temperature overnight, drying in an oven for a shorter period, drying under flowing gas, or drying by residual heat of operation of the actuator, but the drying is not particularly limited to these methods.

According to one or more embodiments of the invention, the substantially homogeneous mixture is comprised of thermochromic material and guest actuation material in a ratio ranging from 1:5 to 1:20.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A thermochromic actuator, comprising:
a thermal responsive artificial actuator; and
a thermochromic coating comprising a thermochromic material, wherein:
the thermochromic coating is disposed on an entire surface of the thermal responsive artificial actuator and is infiltrated into the thermal responsive artificial actuator;
the thermochromic coating has a transition temperature below a rated critical temperature of the thermal responsive artificial actuator; and
the thermochromic coating produces a first color below the transition temperature and a second color above the transition temperature, the second color being different from the first color and indicative of a change of the thermal responsive artificial actuator operation.

2. The thermochromic actuator of claim 1, wherein:
the thermally activated artificial actuator is a polymer based artificial actuator;
the polymer based artificial actuator comprises:
a core fiber that has a radial thermal expansion coefficient, and
a conductive element fixed to the core fiber; and
the thermochromic coating is disposed on a surface of the core fiber or the conductive element.

3. The thermochromic actuator of claim 2, wherein the thermochromic coating has a transition temperature below a rated critical temperature of the core fiber and the conductive element.

4. The thermochromic actuator of claim 3, wherein:
the thermochromic coating comprises a plurality of thermochromic materials with a plurality of transition temperatures and a plurality of colors; and
the plurality of transition temperatures causes a plurality of color transitions before reaching the rated critical temperature.

5. The thermochromic actuator of claim 2, wherein the thermochromic coating comprises an irreversible thermochromic material.

6. The thermochromic actuator of claim 2, wherein the thermochromic material has a transition temperature correlated to a level of actuation in the polymer actuator.

7. The thermochromic actuator of claim 6, wherein:
the thermochromic coating comprises a plurality of thermochromic materials with a plurality of transition temperatures; and
the plurality of transition temperatures is correlated to a plurality of levels of actuation in the polymer actuator.

8. The thermochromic actuator of claim 2, wherein:
the thermochromic coating comprises a thermochromic material with a transition from a substantially black color to a substantially white color;
the substantially black color absorbs thermal radiation to aid in heating the polymer actuator; and
the substantially white color radiates thermal radiation to aid in cooling the polymer actuator.

9. The thermochromic actuator of claim 8, wherein:
the thermochromic coating comprises a plurality of thermochromic materials with a plurality of transition temperatures;
a lower limit and an upper limit of an operational temperature range of the polymer actuator are indicated by the substantially black and substantially white colors; and
the transition temperatures between the lower and upper limits of the operational temperature range are indicated by colors other than the substantially black or substantially white colors.

10. A method of manufacturing the thermochromic actuator of claim 2, comprising:
selecting a thermochromic material based upon a group of parameters comprising:
a transition temperature, and
a color;
mixing the thermochromic material into a substantially homogeneous mixture;
applying the substantially homogeneous mixture onto a surface of the polymer actuator; and
drying the substantially homogeneous mixture to form a thermochromic coating.

11. The thermochromic actuator of claim 1, wherein:
the thermal responsive artificial actuator is a carbon nanotube yarn actuator; and
the thermochromic coating is disposed on an entire surface of the carbon nanotube yarn actuator and is infiltrated into the carbon nanotube yarn actuator.

12. The thermochromic actuator of claim 11, wherein:
the thermochromic coating comprises a plurality of thermochromic materials with a plurality of transition temperatures;
a lower limit and an upper limit of an operational temperature range of the carbon nanotube yarn actuator are indicated by the substantially black and substantially white colors; and
the transition temperatures between the lower and upper limits of the operational temperature range are indicated by colors other than the substantially black or substantially white colors.

13. The thermochromic actuator of claim 1, wherein the thermochromic coating is a blend further comprising:
a guest actuation material.

14. The thermochromic actuator of claim 13, wherein a ratio of the thermochromic material to the guest actuation material is between 1:5 and 1:20.

15. The thermochromic actuator of claim 13, wherein the guest actuation material is a silicone rubber.

16. The thermochromic actuator of claim 1, wherein:
the thermochromic coating comprises a plurality of thermochromic materials with a plurality of transition temperatures and a plurality of colors;
the plurality of transition temperatures a plurality of color transitions; and
one of the plurality of transition temperatures is below one of the rated critical temperature.

17. The thermochromic actuator of claim 1, wherein the thermochromic coating comprises an irreversible thermochromic material.

18. The thermochromic actuator of claim 1, wherein:
the thermochromic coating comprises a thermochromic material with a transition from a substantially black color to a substantially white color;
the substantially black color absorbs thermal radiation to aid in heating the thermal responsive artificial yarn actuator; and
the substantially white color radiates thermal radiation to aid in cooling the thermal responsive artificial yarn actuator.

19. A method of manufacturing the thermochromic actuator of claim 1, the method comprising:
selecting a thermochromic material based upon a group of parameters comprising:
a transition temperature; and
transition colors, the transition colors corresponding to the transition temperature;
mixing the thermochromic material and a guest actuation material into a substantially homogeneous mixture;
applying the substantially homogeneous mixture to a nanotube yarn surface and infiltrate the substantially homogeneous mixture into the nanotube yarn before twisting;
drying the substantially homogeneous mixture to form an infiltrated yarn;
twisting the infiltrated nanotube yarn into a nanotube yarn actuator;
applying an additional amount of the substantially homogeneous mixture to a surface of the thermal responsive yarn actuator; and
drying the thermal responsive yarn actuator with the additional amount of the substantially homogeneous mixture, wherein:
the transition temperature is indicative of a change of thermal responsive yarn actuator operation selected from a yarn actuator degradation and one of actuation levels of the thermal responsive yarn actuator.

20. The method of claim 19, wherein the selected thermochromic material and guest actuation material are mixed with a ratio ranging from 1:5 to 1:20.

21. The thermochromic actuator of claim 1, wherein the change of the thermal responsive artificial actuator operation is a beginning of the thermal responsive artificial actuator degradation.

22. The thermochromic actuator of claim 1, wherein the change of the thermal responsive artificial actuator operation is a change of actuation levels of the thermal responsive actuator.

23. The thermochromic actuator of claim 1, wherein the thermal responsive artificial actuator is a polymer artificial actuator comprises:
a core fiber that has a radial thermal expansion coefficient;
a conductive element fixed to the core fiber; and
the thermochromic coating is disposed on a surface of the core fiber and infiltrated into the core fiber.

* * * * *